United States Patent [19]

Duchemin

[11] 4,003,517

[45] Jan. 18, 1977

[54] ELASTICALLY YIELDABLE RAIL FASTENER

[75] Inventor: Michel Duchemin, Lambres-les-Doual, France

[73] Assignee: Ressorts du Nord S.A., Paris, France

[22] Filed: Apr. 14, 1975

[21] Appl. No.: 567,530

[30] Foreign Application Priority Data

Apr. 19, 1974 France .............................. 74.13725
Apr. 19, 1974 France .............................. 74.13726

[52] U.S. Cl. .................................. 238/349; 238/310
[51] Int. Cl.² ........................................... E01B 9/30
[58] Field of Search ................. 238/349, 351, 310; 267/158, 160, 161, 164

[56] References Cited

UNITED STATES PATENTS

| 1,320,259 | 10/1919 | Märtens | 238/349 UX |
| 2,057,963 | 10/1936 | Maney | 238/349 X |
| 2,480,388 | 8/1949 | Sonneville | 238/349 |
| 2,992,498 | 7/1961 | Mork | 267/158 X |

FOREIGN PATENTS OR APPLICATIONS

| 249,315 | 1/1964 | Australia | 238/349 |
| 868,568 | 5/1961 | United Kingdom | 238/349 |

Primary Examiner—Robert J. Spar
Assistant Examiner—Randolph A. Reese
Attorney, Agent, or Firm—Burns, Doane, Swecker & Mathis

[57] ABSTRACT

The fastener structure comprises at least one main bending strip which defines an aperture for the passage of a clamping bolt for the fastener structure. An elastically yieldable second strip extends transversely of the general direction of the fastener structure and is curved in the direction of the length of the second strip and has its concavity facing the main strip. The two ends of the second bear against the edges of the main strip.

10 Claims, 14 Drawing Figures

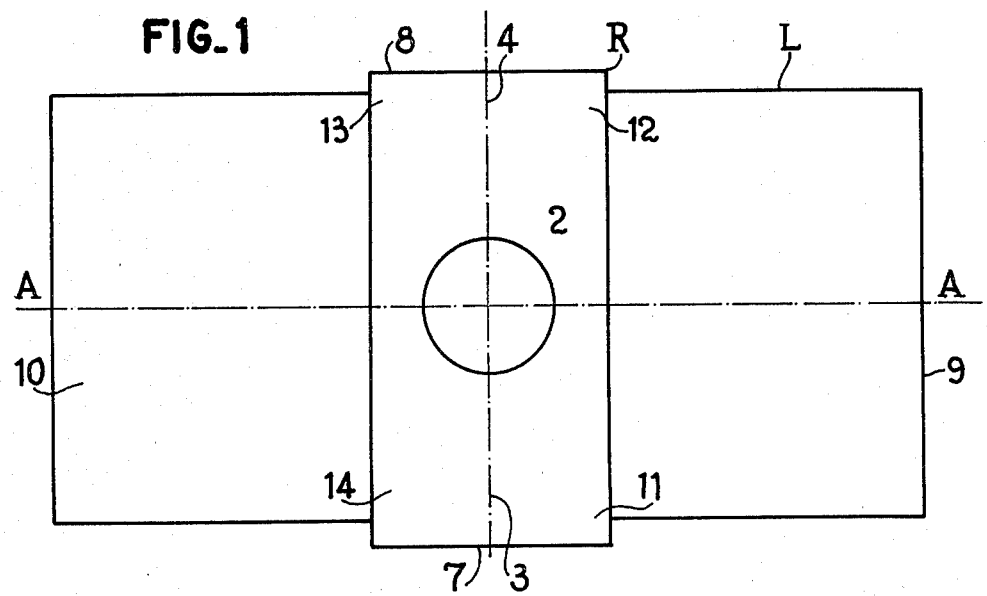
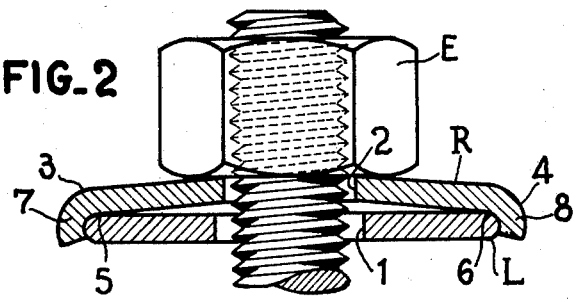
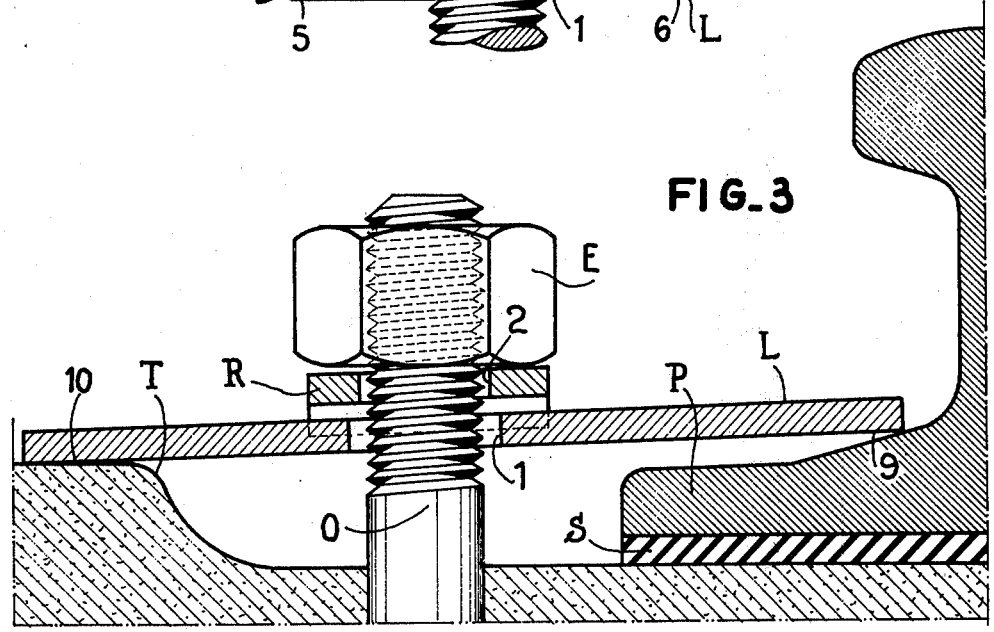

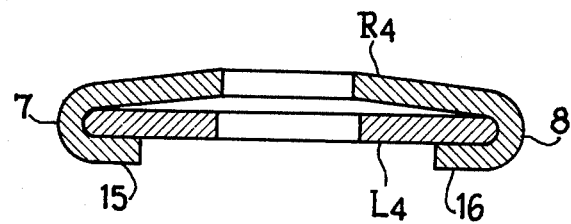
FIG_4
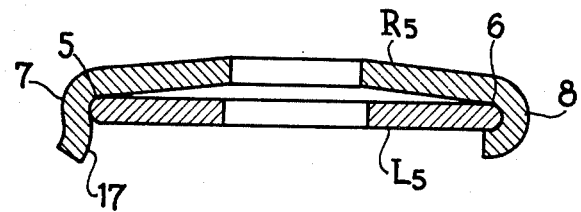
FIG_5
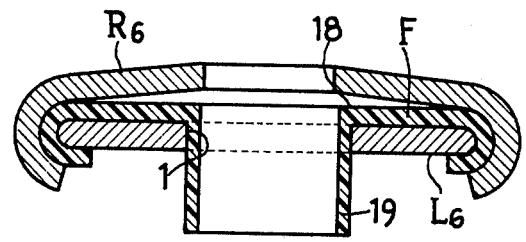
FIG_6

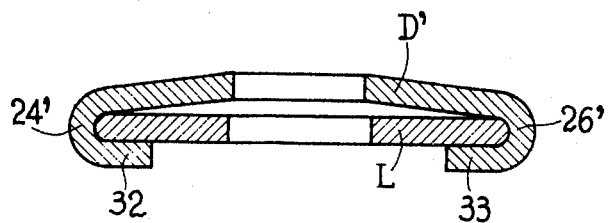
FIG_10
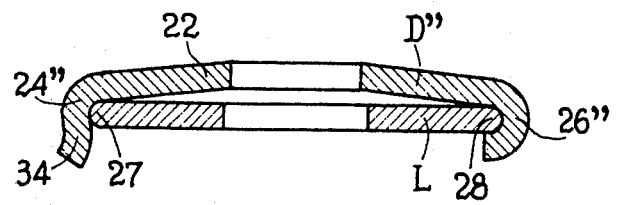
FIG_11
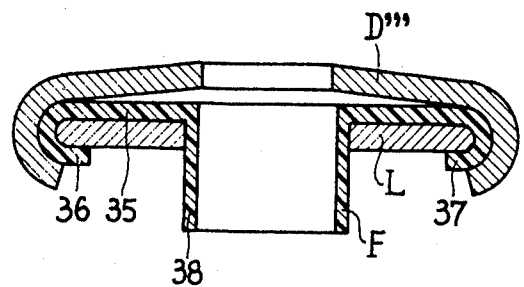
FIG_12

ELASTICALLY YIELDABLE RAIL FASTENER

The present invention relates to elastically yieldable fasteners for fastening rails to their support.

Railway rails are usually fastened to the supporting sleepers or ties by elastically yieldable fasteners and in particular fasteners formed by a spring strip which bears at one end against the flange of the rail and at the other end against the rail support and is provided between these ends with an aperture for the passage of the shank of clamping means. These clamping means comprise a head which exerts a force on the strip.

In order to increase the comfort and the permitted speed of the trains there is interposed between the rail and the sleeper or tie a sole of rubber which is of increasing flexibility and increases the vertical movement of the rails. However, the rail must be maintained with a greater force. The elastically yieldable fastener which must accommodate the movements of the rail must therefore be more flexible and stronger.

Moreover, when the sleeper is not itself insulated the rail must be elastically insulated. This is achieved by means of a washer which is placed under the head of the clamping means and is integral with a collar/surrounding the shank of the clamping means in the aperture in the strip. The aperture is therefore rather large and reduces the strength of the fastener.

In order to overcome this drawback it has been proposed to superpose on the strip a reinforcing strip, the insulation being achieved either in the same manner as before or by means of an insulating plate which is disposed between the two strips and is integral with a collar surrounding the shank of the clamping means in the aperture formed in the lower strip. There is thus a reinforcement of the fastener but a decrease in the flexibility which opposes the present requirements.

An object of the present invention is to provide another arrangement which consists in applying to the strip the force of the clamping through an elastically yieldable means which modifies the distribution of the forces and stresses and adds its own flexibility to that of the strips.

According to the invention, there is provided an elastically yieldable fastener for a railway comprising at least one main bending strip provided with an aperture for the passage of clamping means, wherein there is provided a transverse elastically yieldable means which is perpendicular to the general direction of the fastener and curved in the direction of its length so that its concavity is directed toward the main strip whereas its ends are bearing against the edges of the main strip.

The elastically yieldable means preferably comprise a strip which is bent in the direction of its length but which may also be formed by a strip which is pressed-formed in its center so that it has the shape of a truncated cone extended by flap portions. These means are provided with an aperture and mounted coaxially with the aperture of the main strip between the latter and the clamping means.

With this arrangement, the force is distributed over the strip and this decreases the stresses around the aperture. In order to decrease the stresses still further, the edges may be so arranged as to thicken the spring strip.

The loss of flexibility resulting therefrom is compensated for by the flexibility of the elastically yieldable means.

Further features and advantages of the invention will be apparent from the ensuing description with reference to the accompanying drawings given solely by way of example and in which:

FIG. 1 is a plan view of the fastener;

FIG. 2 is a cross-sectional view of a fastener according to the invention;

FIG. 3 is a longitudinal sectional view taken on line A—A of FIG. 1;

FIGS. 4, 5 and 6 are cross-sectional views of modifications of the fastener;

FIGS. 10, 11 and 12 are cross-sectional views of modifications of the fastener shown in FIG. 9, and FIGS. 13 and 14 are longitudinal sectional views of modifications of fasteners according to the invention.

Figure 8:
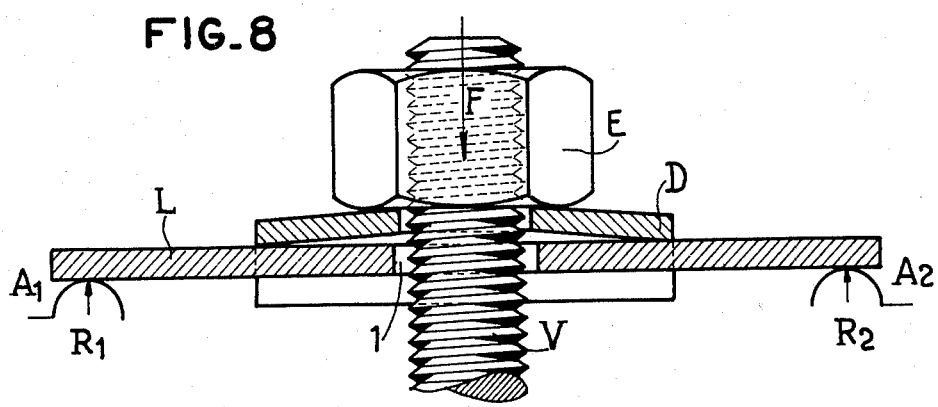
FIG. 8 is a longitudinal sectional view taken on line B—B of FIG. 7.

With reference first to FIGS. 1, 2 and 3, there is shown a rectangular elastically yieldable strip L, or main strip, provided with an aperture 1 in its middle and surmounted by a bent transverse elastically yieldable means as strip R provided with a center aperture 2. The strip R bears in the vicinity of its end portions 3 and 4 against the edges 5 and 6 of the strip 5L, whereas in the region of the apertures a space is provided between the two strips. The strip R terminates in flanges 7 and 8 which extend around the edges of the strip L. The aperture 2 of the strip R is coaxial with the aperture 1 of the strip L. In use, one end of the fastener thus constructed, for example end 9 of the strip L, is placed on the flange P of the rail and the other end 10 on a sleeper or tie T which supports the rail through a sole S of rubber. The shank O of clamping means anchored in the sleeper T passes through the apertures 1 and 2 of the strips L and R. The head E, or a nut of the clamping means, exerts a force at the center of the strip R which transmits this force to the edges 5 and 6 of the strip L. The two strips bend in two perpendicular directions.

Owing to the effect of flanges 7 and 8, the strip R slightly bends, in the direction 3–4 whereas the strip L bends in the perpendicular direction 9–10. The strip R then only bears against the strip L at the corners 11, 12, 13 and 14 and this avoids high stresses in the region of the apertures 1 and 2.

FIG. 4 shows that, if desired, it is possible to reinforce the strip L4 by stiffening it by means of folds 15 and 16 of the flanges 7 and 8 of the strip R4. These folds prevent the bending of the strip L in this region and considerably reduce the stresses therein. The parts of the fastener are then substantially relatively stationary.

The modification shown in FIG. 5 does not afford the same stiffening but on the other hand facilitates the assembly of the strip R5 with the strip L5. One of the flanges, for example 7, is bent outwardly in the form of a clasp 17. By first engaging the flange 8 on the edge 6 of the strip L5 and then placing the clasp 17 on the edge 7 of the strip L5, a pressure exerted on the strip R5 straightens it a little and hooks the flange 7 to the edge 5 of the strip L5.

When the rail must be electrically insulated from the sleeper, there may be interposed, as shown in FIG. 6, a sleeve F of insulating material, having a plate 18 and a collar 19, between the strip R6 and the strip L6. The strip L6 is then of course provided with an aperture 1 which is a little larger but the aperture of the strip R6 may have the same dimension.

Such a fastener permits the fastening of railway rails to their support when this fastening requires great force and high elasticity. The region of the aperture for the passage of the clamping means is relieved of forces and the forces are transferred to the edges of the strip L. It will be understood that this presupposes that the distance between the aperture and these edges is sufficient, that is to say the strip is relatively wide, which is usually the case.

However, in certain circumstances, it may be preferable to reduce the width of the strip. The transverse strip is then bent not only in the direction of its length but also in the transverse direction, to ensure a more even distribution of the forces and stresses throughout the periphery of the apertures.

Figure 7:
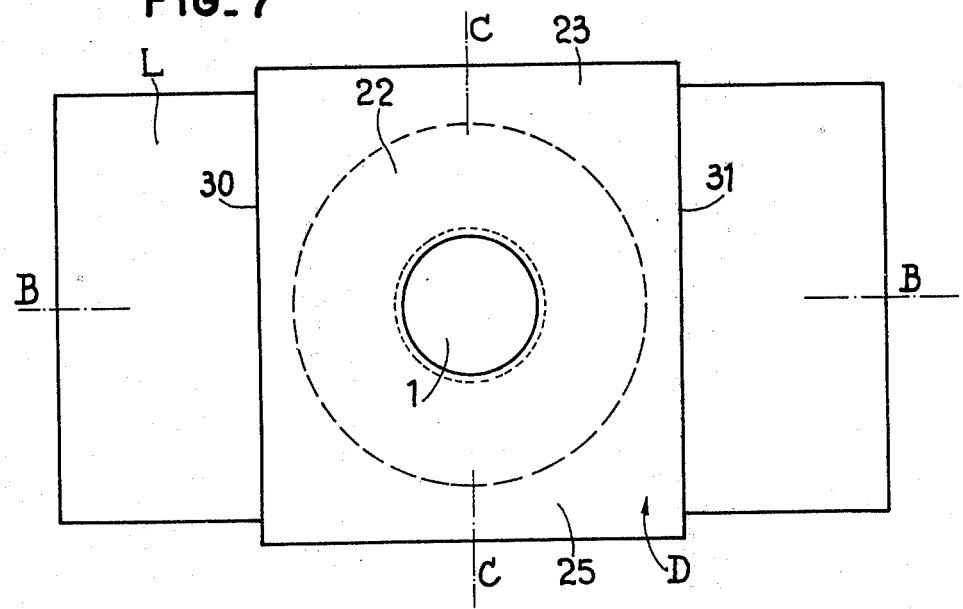
FIG. 7 is a plan view of another embodiment of a fastener according to the invention.
Figure 9:
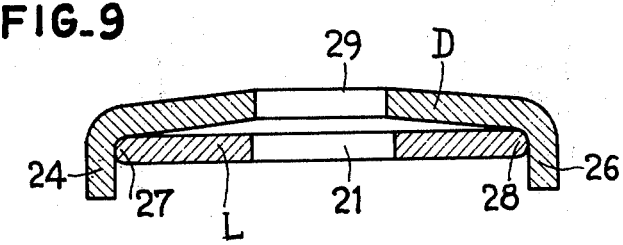
FIG. 9 is a cross-sectional view taken on line C—C of FIG. 7.

A fastener thus constructed is shown in FIGS. 7 to 9.

In FIGS. 7 to 9, the rectangular and elastically yieldable strip L is provided with an aperture 1 in its middle and surmounted by an elastically yieldable means or strip D whose center portion forms a truncated cone 22 whose large base is flattened against the strip L and is extended by flap portions 23 and 25 which terminate in flanges 24 and 26 adapted to engage the edges 27 and 28 of this strip L.

The small base 29 of the truncated cone is traversed by the clamping means, comprising for example a screw V and a nut E, which bear against the small base 29 of the truncated cone.

The force F that the nut E exerts is transmitted, through the flap portions 23 and 25 and the flattened large base of the truncated cone 22, to the strip L which receives from its supports A1 and A2 the reactions R1 and R2.

The truncated cone 22 is flattened and the strip L bends.

The flanges 24 and 26 prevent the device D from rotating and in addition they stiffen it with respect to the longitudinal bending of the strip L.

The force transmitted to the strip L, although distributed over a region corresponding to the periphery of the strip D, is exerted then above all in the vicinity of the edges 30 and 31 of the strip D outside the section C—C of the strip L, which is weaker owing to the presence of the aperture 1.

It will be understood that the curved strip D permits, in the same manner as the strip R, a reinforcement of the fastener by a suitable conformation of the flanges of the flap portions.

FIG. 10 shows that it is possible, if desired, to reinforce the strip L by stiffening it by folds 32 and 33 of the edges 24' and 26' of the device D'. These folds, in preventing the bending of the strip L in this region, considerably reduce the stresses therein. The strip and the device become practically inseparable.

The modification shown in FIG. 11 does not afford the same stiffening but permits on the other hand the assembly of the device D'' with the strip L. One of the edges, for example 24'', is bent outwardly in the form of a clasp 34. By first engaging the flange 26'' on the edge 28 of the strip L and placing the clasp 34 on the edge the of the strip L, a pressure exerted on the truncated cone 22 straightens it a little and hooks the flange 24'' to the edge 27 of the strip L.

The clamping means may also be electrically insulated from the strip. FIG. 12 shows a solution of this problem. A sleeve F of insulating material having a plate 35 and flanges 36 and 37 and a collar 38 is interposed between the strip L and the device D'''. The strip L is of course provided with an aperture 1 which is a little larger, but the aperture of the device D''' may have the same dimension.

Figure 13:
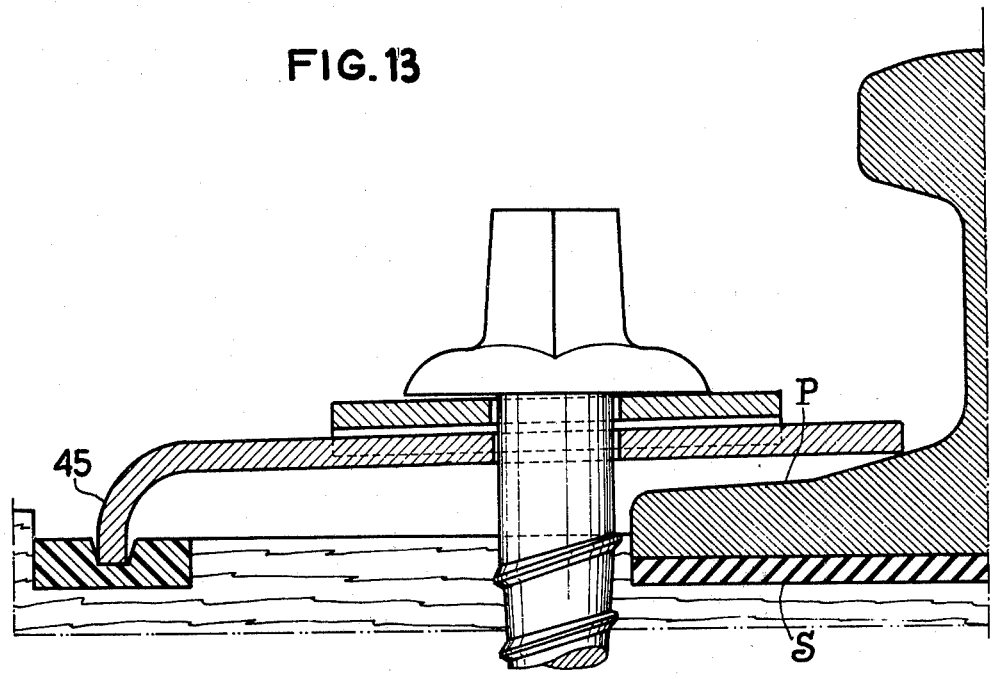
Figure 14:
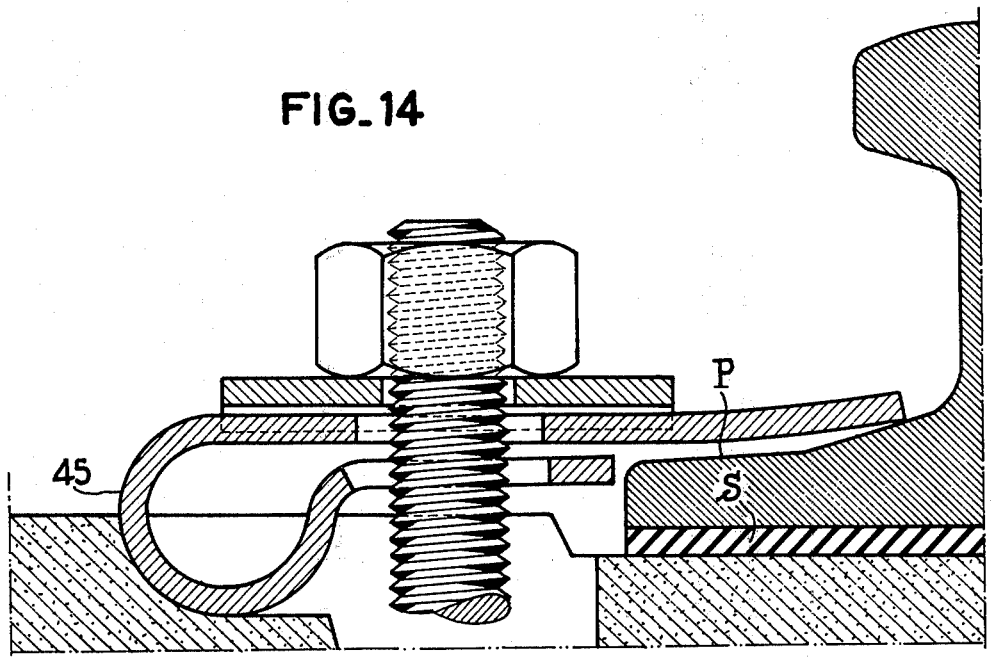

In certain cases, according to FIG. 13 or 14, it may be well to bend the end 45 of the fastener in the direction of the sleeper. It will be understood that the invention is also applicable to this type of fastener.

As in the foregoing embodiments, it ensures a good distribution of the stresses by relieving the weakest region of the strip, which reinforces the fastening while it has an increased flexibilty.

Having now described my invention what I claim as new and desire to secure by Letters Patent is:

1. An elastically yieldable fastener structure for a railway rail comprising at least one main bending strip defining an aperture for the passage of clamping means for the fastener structure and extending in a first general direction and having lateral edges extending substantially in said first direction, an elastically yieldable means which extends in a second general direction substantially perpendicular to said first direction and is curved in said second direction and has a concavity directed toward the main strip and has two end portions which are respectively in bearing relation to said edges of the main strip so that when a clamping force is exerted on the yieldable means by said clamping means the yieldable means transmits said clamping force to the strip in the region of said end portions and relieves the strip of said clamping force in the region of said aperture.

2. A fastener as claimed in claim 1, wherein the elastically yieldable means is a second strip bent in a direction of the largest dimension of the second strip which is in said second direction.

3. A fastener as claimed in claim 1, wherein the elastically yieldable means is a second strip which is deformed in such manner as to form in a center portion of the second strip a highly divergent truncated cone having a large base flattened against the main strip and extended by four flap portions two of which flap portions define said two end portions.

4. A fastener as claimed in claim 1, wherein the elastically yieldable means is a second strip having adjacent said end portions of the second strip parallel flanges alongside said edges of the main strip for guiding the second strip with respect to the main strip.

5. A fastener as claimed in claim 4, wherein the guiding flanges are folded around said edges of the main strip.

6. A fastener as claimed in claim 1, wherein the yieldable means defines a central aperture.

7. A fastener as claimed in claim 1, wherein the elastically yieldable means is a second strip, and one of the strips has parallel flanges in engaging relation to edges of the other strip for guiding said one strip relative to said other strip.

8. A fastener as claimed in claim 7, wherein at least one of said flanges is shaped in such manner as to be clippable onto the corresponding edge of the said other strip.

9. A fastener as claimed in claim 1, further comprising a member of elastically insulating material interposed between the main strip and the elastically yieldable means.

10. An elastically yieldable fastener structure for a railway rail comprising at least one main bending strip defining an aperture for the passage of clamping means for the fastener structure and extending in a first general direction and having lateral edges extending substantially in said first direction, an elastically yieldable second strip which extends in a second general direction substantially perpendicular to said first direction and is curved in said second direction and has a concavity facing toward the main strip and has two end portions which are respecitively in respectively downwardly bearing relation to said edges of the main strip and two flanges extending downwardly from the second strip and extending substantially throughout said end portions in adjoining relation to said end portions in a direction substantially parallel to said lateral edges of the main strip so as to stiffen the second strip against bending in said first direction.

* * * * *